United States Patent
Xu et al.

(10) Patent No.: US 12,425,070 B1
(45) Date of Patent: Sep. 23, 2025

(54) ADAPTIVE CANCELLATION OF ASYNCHRONOUS NEAR-END CROSSTALK

(71) Applicant: Marvell Asia Pte Ltd, Singapore (SG)

(72) Inventors: Junyi Xu, Fremont, CA (US); Zuoen Wang, Mountain View, CA (US); Xing Wu, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 451 days.

(21) Appl. No.: 17/973,571

(22) Filed: Oct. 26, 2022

Related U.S. Application Data (60) Provisional application No. 63/273,130, filed on Oct. 28, 2021.

(51) Int. Cl.
*H04B 3/32* (2006.01)
*G06F 1/08* (2006.01)
*G06F 1/14* (2006.01)

(52) U.S. Cl.
CPC ............... *H04B 3/32* (2013.01); *G06F 1/08* (2013.01); *G06F 1/14* (2013.01)

(58) Field of Classification Search
CPC .. H04B 3/32; H04B 3/34; H04B 3/487; H04J 1/12; H04J 3/10; H04Q 2011/0049; H04Q 2201/14
See application file for complete search history.

(56) References Cited

U.S. PATENT DOCUMENTS

| | | | |
|---|---|---|---|
| 8,659,986 B1 | 2/2014 | Martinson et al. | |
| 10,873,365 B1 | 12/2020 | Sedarat | |
| 2001/0055331 A1* | 12/2001 | Agazzi | H04B 3/23 375/216 |
| 2002/0122503 A1 | 9/2002 | Agazzi | |
| 2003/0142687 A1* | 7/2003 | Lin | H04L 7/0029 370/463 |
| 2005/0099967 A1* | 5/2005 | Baba | H04B 3/32 370/286 |
| 2007/0146179 A1* | 6/2007 | Batruni | H03H 17/0273 341/118 |
| 2007/0237270 A1 | 10/2007 | Mezer et al. | |
| 2017/0366175 A1* | 12/2017 | Feldtkeller | H03K 17/687 |
| 2019/0123781 A1* | 4/2019 | Linney | H04M 11/062 |
| 2021/0184757 A1* | 6/2021 | Huang | H04B 3/04 |

OTHER PUBLICATIONS

European Application # 24162138.2 Search Report dated Jul. 19, 2024.

Stathaki et al., "13: Resampling Filters", pp. 1-81, presentations of DSPDF Course (Digital Signal Processing and Digital Filters), year 2017.

* cited by examiner

*Primary Examiner* — Steven Hieu D Nguyen
(74) *Attorney, Agent, or Firm* — Meitar Patents Ltd.; Daniel Kligler (57) ABSTRACT

A method for communication includes receiving first data timed by a first clock and receiving a signal including second data timed by a second clock, which is independent of the first clock, and generating a stream of data samples corresponding to the second signal. The received first data are resampled responsively to a time-varying phase shift between the first and second clocks to generate resampled data timed by the second clock. The resampled data are applied in estimating and subtracting an alien crosstalk component from the stream of data samples.

18 Claims, 5 Drawing Sheets

ADAPTIVE CANCELLATION OF ASYNCHRONOUS NEAR-END CROSSTALK

CROSS-REFERENCE TO RELATED APPLICATION

This application claims the benefit of U.S. Provisional Patent Application 63/273,130, filed Oct. 28, 2021, which is incorporated herein by reference.

FIELD

The present invention relates generally to digital communications, and particularly to cancellation of interference in communication signals.

BACKGROUND

Many local-area networks use Ethernet over twisted-pair technologies. Standardized versions of this technology include the original 10BASE-T, followed more recently by 1000BASE-T and 10GBASE-T, operating at speeds up to 10 Gbps. These variants are referred to collectively as "BASE-T" systems.

BASE-T signals are subject to various types of interference, due to both internal and external sources. The internal sources occur within the same link as the signal and include inter-symbol interference (ISI); echo; and pair-to-pair such crosstalk, as far-end crosstalk (FEXT) and near-end crosstalk (NEXT), between different wire pairs that connect to the same transceivers. Such noise sources share the same clock as the BASE-T signal itself and can generally be mitigated effectively with cancelers and equalizers.

External sources give rise to "alien" interference, which is harder to cancel. For example, in a multi-port BASE-T system, in which multiple links are connected to neighboring plug receptacles, alien interference on a given link can arise from signals conveyed over an adjacent link. For example, alien near-end crosstalk (ANXT) in the receiver on one link can arise due to the signals transmitted by the transmitter on the adjacent link.

SUMMARY

Embodiments of the present invention that are described hereinbelow provide improved methods and devices for mitigation of alien interference.

There is therefore provided, in accordance with an embodiment of the invention, communication apparatus, including a transmitter, which is coupled to transmit over a first communication link a first signal including first data timed by a first clock. A receiver is disposed in proximity to the transmitter and includes a front end coupled to receive over a second communication link a second signal including second data timed by a second clock, which is independent of the first clock, and to generate a stream of data samples corresponding to the second signal. An input buffer is coupled to receive the first data, timed by the first clock, from the transmitter. A phase detector is configured to measure a time-varying phase shift between the first clock and the second clock. An adaptive resampling circuit is configured to resample the first data in accordance with the measured phase shift to generate resampled data timed by the second clock. A crosstalk cancellation circuit is configured to apply the resampled data in estimating and subtracting an alien crosstalk component from the stream of data samples.

In a disclosed embodiment, the first and second communication links are Ethernet BASE-T links.

In one embodiment, the crosstalk cancellation circuit includes a digital filter, which is configured to filter the resampled data to generate a crosstalk error signal, and a subtracter, which is coupled to subtract the crosstalk error signal from the data samples.

In some embodiments, the adaptive resampling circuit includes a Farrow filter, which is configured to apply resampling coefficients to the first data to generate the resampled data. Typically, the time-varying phase shift measured by the phase detector includes an integer component and a fractional component, and the adaptive resampling circuit is configured to adjust the resampling coefficients of the Farrow filter responsively to the fractional component of the time-varying shift. In a disclosed embodiment, the adaptive resampling circuit is configured to select the first data from the input buffer responsively to the integer component of the time-varying phase shift for processing by the Farrow filter.

Additionally or alternatively, the adaptive resampling circuit is configured to adjust a rate of resampling the first data responsively to a fill level of the input buffer, so as to maintain the fill level within predefined bounds. In one embodiment, the input buffer includes first and second first-in first-out (FIFO) memories and a buffer input circuit, which is coupled to write samples of the first data in alternation to the first and second FIFO memories timed by the first clock, and the adaptive resampling circuit includes a filter input circuit, which is coupled to read out the samples of the first data from the first and second FIFO memories in alternation, at times that are timed by the second clock and depend on the fill level.

In a disclosed embodiment, the receiver includes an equalizer, which is coupled to receive and filter the stream of data samples following subtraction of the alien crosstalk component.

There is also provided, in accordance with an embodiment of the invention, a method for communication, which includes receiving first data timed by a first clock and receiving a signal including second data timed by a second clock, which is independent of the first clock, and generating a stream of data samples corresponding to the second signal. The received first data are resampled responsively to a time-varying phase shift between the first and second clocks to generate resampled data timed by the second clock. The resampled data are applied in estimating and subtracting an alien crosstalk component from the stream of data samples.

In some embodiments, resampling the received first data includes measuring the time-varying phase shift and adaptively resampling the first data in accordance with the measured phase shift.

In a disclosed embodiment, the first data are transmitted over a first communication link, and the signal is received over a second communication link, in proximity to the first communication link, and applying the resampled data includes reducing the alien crosstalk in the signal due to the first communication link.

The present invention will be more fully understood from the following detailed description of the embodiments thereof, taken together with the drawings in which:

DETAILED DESCRIPTION

By comparison with internal sources of interference arising within a given link, alien interference, such as ANXT, is difficult to filter out. One of the reasons for this difficulty is that alien interference is asynchronous with respect to the link on which the interference occurs (referred to herein as the "victim link"). In common Base-T Ethernet systems, for example, each link has its own, independent transceiver, operating on its own clock. The clocks of neighboring links are generally not synchronized. Therefore, even when the alien transmitted signal on a neighboring link is known, the resulting ANXT is asynchronous and cannot be filtered out of the signal on a victim link using a static digital filtering scheme.

Embodiments of the present invention that are described herein address this problem by adaptive resampling of the transmitted signal data on the neighboring link. The disclosed resampling scheme, using a Farrow filter, for example, tracks the phase difference between the clocks of the alien transmitted signal and the received signal on the victim link, and adjusts the resampling coefficients dynamically to compensate for changes in the phase difference. The resampled signal data is then filtered and subtracted out of the received signal data in the clock domain of the receiver.

Another problem that can arise in ANXT cancellation is that the sampling buffer holding the transmitted signal data may overflow or underflow due to the difference in clock rates between the alien and victim signals. In some embodiments, to address this problem, the resampling rate is adjusted dynamically to maintain the fill level of the resampling buffer within predefined bounds, notwithstanding the difference between the clocks.

The disclosed embodiments thus provide communication apparatus, comprising a transmitter, which transmits a first signal comprising first data timed by a first clock over a first communication link, and a receiver, in proximity to the transmitter. The receiver comprises a front end coupled to receive a second signal comprising second data timed by a second clock over a second communication link, which is independent of the first clock. The front end generates a stream of data samples corresponding to the second signal. In the embodiments that are described below, the first and second communication links are assumed to be Ethernet BASE-T links. Alternatively, the principles of the present invention may be applied to other types of adjacent asynchronous links, such as links operating in accordance with other Ethernet standards, as well as serializer/deserializer (SerDes) links.

For the purpose of ANXT cancellation, in the disclosed embodiments, the receiver comprises an input buffer coupled to receive samples of the first data, timed by the first clock, from the transmitter. A phase detector measures the time-varying phase shift between the first clock and the second clock. An adaptive resampling circuit resamples the first data in accordance with the measured phase shift to generate resampled data timed by the second clock. A crosstalk cancellation circuit applies the resampled data in estimating and subtracting the alien crosstalk component due to the first signal from the stream of data samples.

Figure 1:
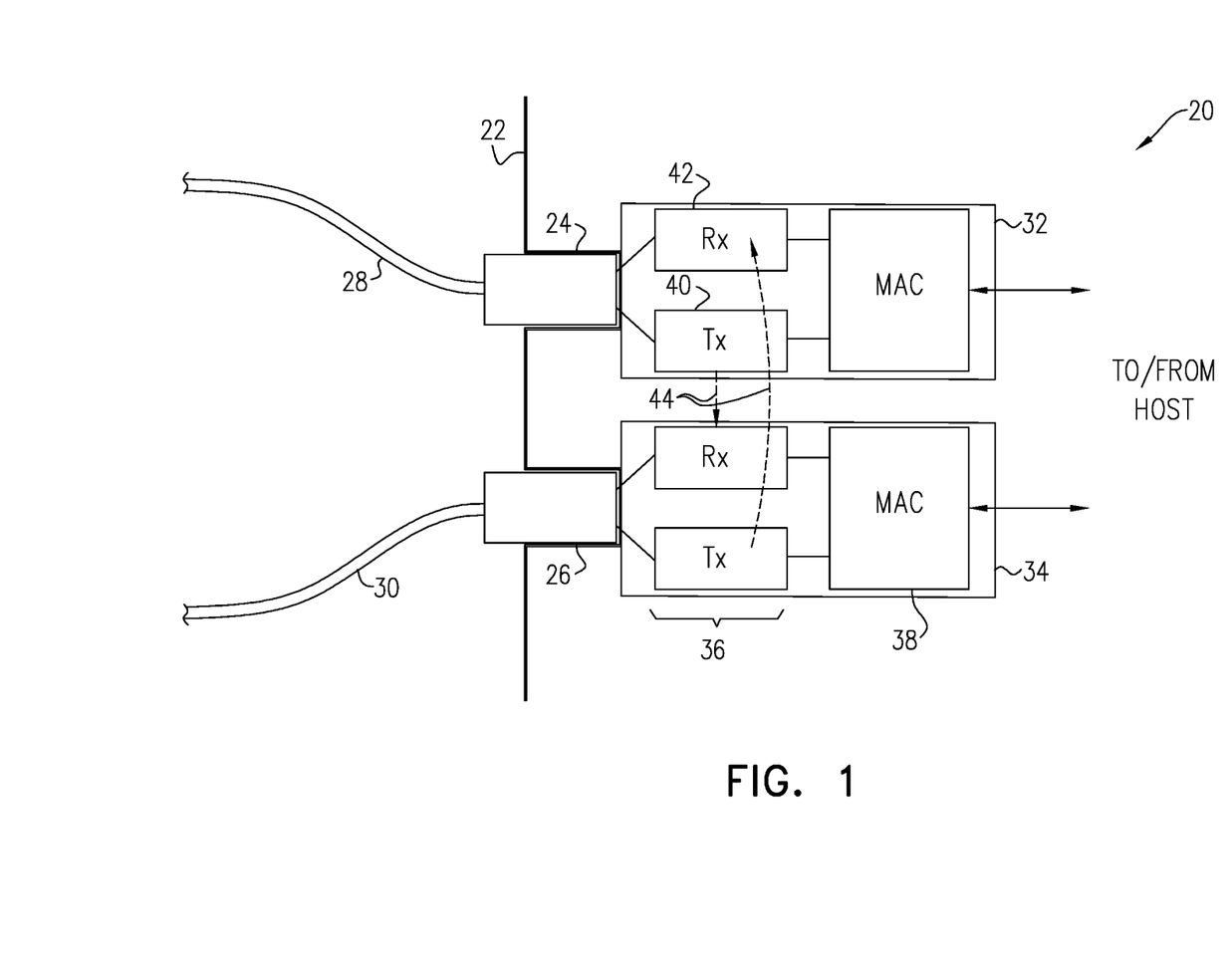
FIG. 1 is a block diagram that schematically illustrates a communication system, in accordance with an embodiment of the invention.

FIG. 1 is a block diagram that schematically illustrates a communication system 20, in accordance with an embodiment of the invention. System 20 in the pictured example comprises two Ethernet Base-T links, which are served by circuitry contained behind a panel 22. The links comprise respective receptacles 24, 26, such as RJ-45 receptacles, in mutual proximity, which receive the connectors of respective cables 28, 30. Although for the sake of simplicity, system 20 is shown as comprising only two links, the principles of the present embodiments may readily be extended to systems comprising larger numbers of links, as well as links operating in accordance with other communication standards, as noted above.

Each link in system 20 is served by a respective transceiver 32, 34, which includes a physical layer (PHY) interface 36 and a media access control (MAC) interface 38. Each PHY interface 36 comprises a transmitter (Tx) 40, which transmits data signals over the respective cable 28, 30, and a receiver (Rx) 42, which receives data signals over the cable. Each receiver 42 converts the received data signals to a stream of data values for output to MAC interface 38, The MAC interface comprises digital logic circuits, which perform link-layer functions, as are known in the art, and convey the received data to a host, such as a microprocessor or microcontroller.

As noted earlier, PHY interfaces 36 in transceivers 32 and 34 transmit and receive signals that are timed by respective clocks, which are independent of one another. Consequently, each transceiver 32, 34 is subject to asynchronous ANXT from the neighboring transceiver. To mitigate this ANXT, each transmitter 40 conveys samples of data 44 that it is processing for transmission over its respective cable 28, 30 to receiver 42 of the neighboring transceiver. The timing of the samples of data 44 conveyed by each transmitter 40 is controlled in accordance with the respective clock of the transceiver. Receiver 42 resamples data 44 in accordance with its own clock and applies the resampled data in canceling interference due to ANXT, using digital logic circuits as described in detail hereinbelow.

Figure 2:
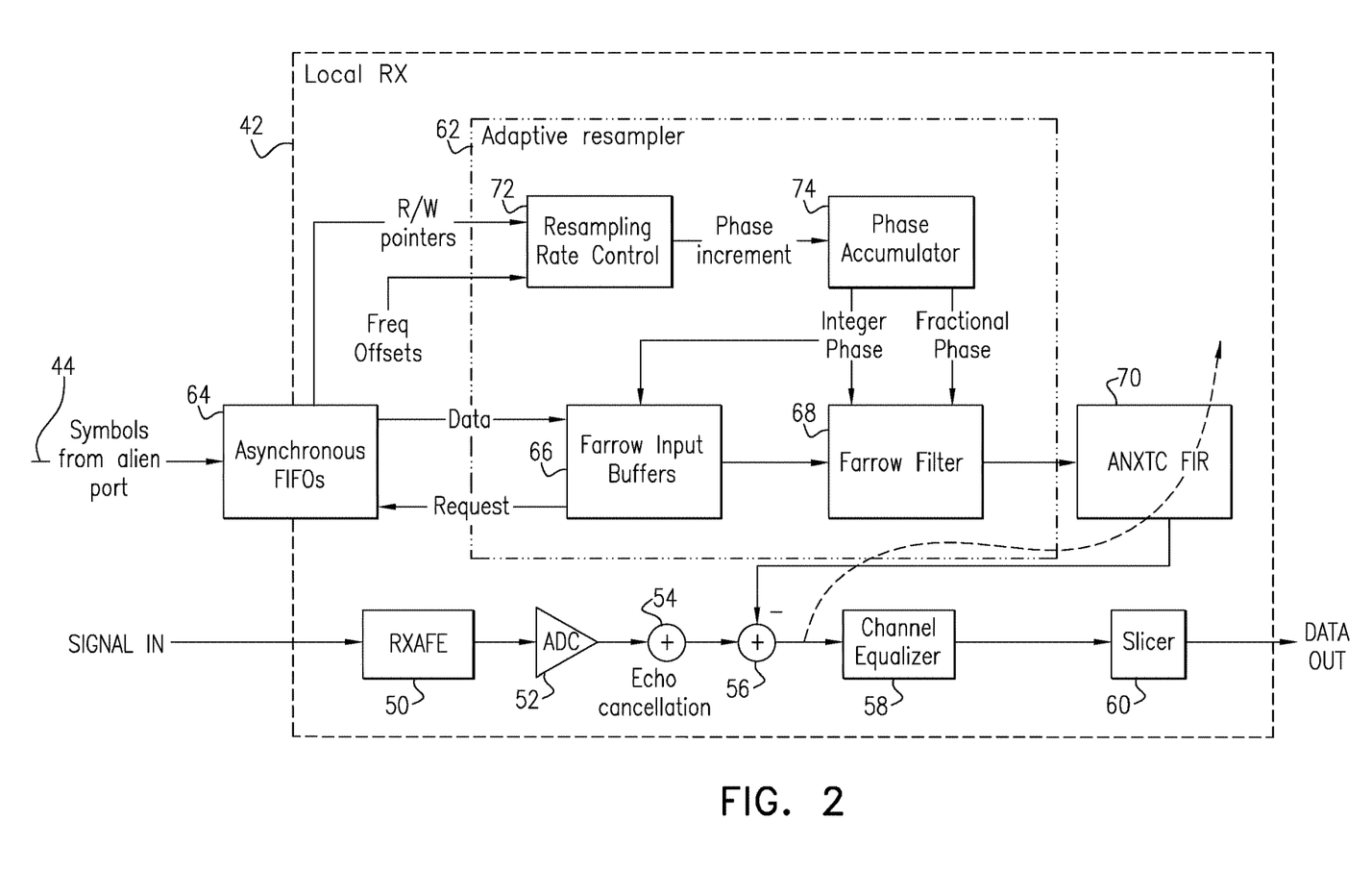
FIG. 2 is a block diagram that schematically illustrates a receiver, in accordance with an embodiment of the invention.

FIG. 2 is a block that schematically diagram shows details of receiver 42, in accordance with an embodiment of the invention. For the sake of simplicity, the description that follows relates to the receiver in transceiver 34. Transceiver 32 typically operates in an identical fashion.

Receiver 42 comprises a front end including an analog front end (RxAFE) circuit 50, which receives an incoming signal over a communication link, such as over cable 30. The front end also comprises an analog/digital converter (ADC) 52, which generates a stream of data samples corresponding to the incoming signal. The sample stream and subsequent processing of the received signal are timed by the internal clock of transceiver 34. An echo cancellation circuit 54 cancels echoes and crosstalk due to the signals transmitted by transmitter 40 in transceiver 34. An adder/subtracter 56 subtracts an ANXT error signal from the stream of data samples. (Alternatively, an inverse of the ANXT error could be generated and then added to the data stream to remove the ANXT component. References to a "subtracter" in the present description and in the claims include all possible implementations of such an adder/subtracter.) Computation of the ANXT error signals is described in detail hereinbelow.

Following subtraction of the ANXT error signal, an equalizer 58 filters the stream of data samples to reduce ISI. A slicer 60 then converts the filtered samples into a stream of digital data values. The order of digital processing operations that is shown in FIG. 2 is advantageous in reducing the required length of the finite impulse response (FIR) that is used for equalization. Alternatively, however, the order of echo processing operations may be modified, for example with echo cancellation following equalization. Following slicer 60, the digital data values are decoded, as is known in the art, and the resulting decoded data values are output to MAC interface 38.

For purposes of ANXT cancellation, receiver 42 receives samples of data 44 transmitted by transceiver 32 and stores the samples in an input buffer 64. In the implementation that is described below, input buffer 64 comprises a pair of first-in first-out (FIFO) memories, although other buffering configurations may alternatively be used, Buffer 64 is populated in accordance with the clock of transceiver 32, which is asynchronous with the clock of transceiver 34.

An adaptive resampling circuit 62 resamples the data in buffer 64 to match the data to the clock of transceiver 34. For this purpose, a resampling rate control circuit 72 receives an indication of the frequencies of the respective clocks of transceivers 32 and 34 (for example, in terms of respective offsets of the frequencies relative to a reference) and serves as a phase detector, to measure the phase shift between the clocks. This phase shift typically varies over time, since the clock rates and phases are independent. Resampling rate control circuit 72 outputs a stream of phase increments, indicative of changes in the phase shift between the clocks, to a phase accumulator 74, which tracks the cumulative phase difference between the respective clocks of transceivers 32 and 34 over time.

The cumulative phase difference computed by phase accumulator 74 includes an integer component and a fractional component. The integer component indicates the total sample shift between alien data 44 transmitted by transceiver 32 and the incoming data samples generated by ADC 52; while the fractional component indicates the current phase offset between the local and alien clocks. Both components are used by a Farrow filter 68 in processing alien data 44 to generate resampled data timed by the clock of transceiver 34. The integer component is used by a filter input circuit 66 in selecting the samples of alien data from input buffer 64 that are to be input to Farrow filter 68 in each clock cycle. The fractional component is applied in adjusting the resampling coefficients of the Farrow filter and in updating these resampling coefficients as the phase shift between the local and alien clocks changes over time. These functions of adaptive resampling circuit 62 are described in greater detail hereinbelow.

A digital filter 70 operates on the resampled data output by Farrow filter 68 to generate a crosstalk error signal, Adder/subtracter 56 subtracts the crosstalk error signal from the data samples received from cable 30, as noted above. Digital filter 70 may conveniently be implemented as a FIR, although any other suitable type of digital filter may alternatively be used. The coefficients of digital filter 70 are typically set adaptively, for example using a training procedure upon startup of system 20. The objective of the training is to minimize the residual ANXT error component following adder/subtracter 56 (and before equalizer 58), as indicated by a dashed arrow in FIG. 2.

Figure 3:
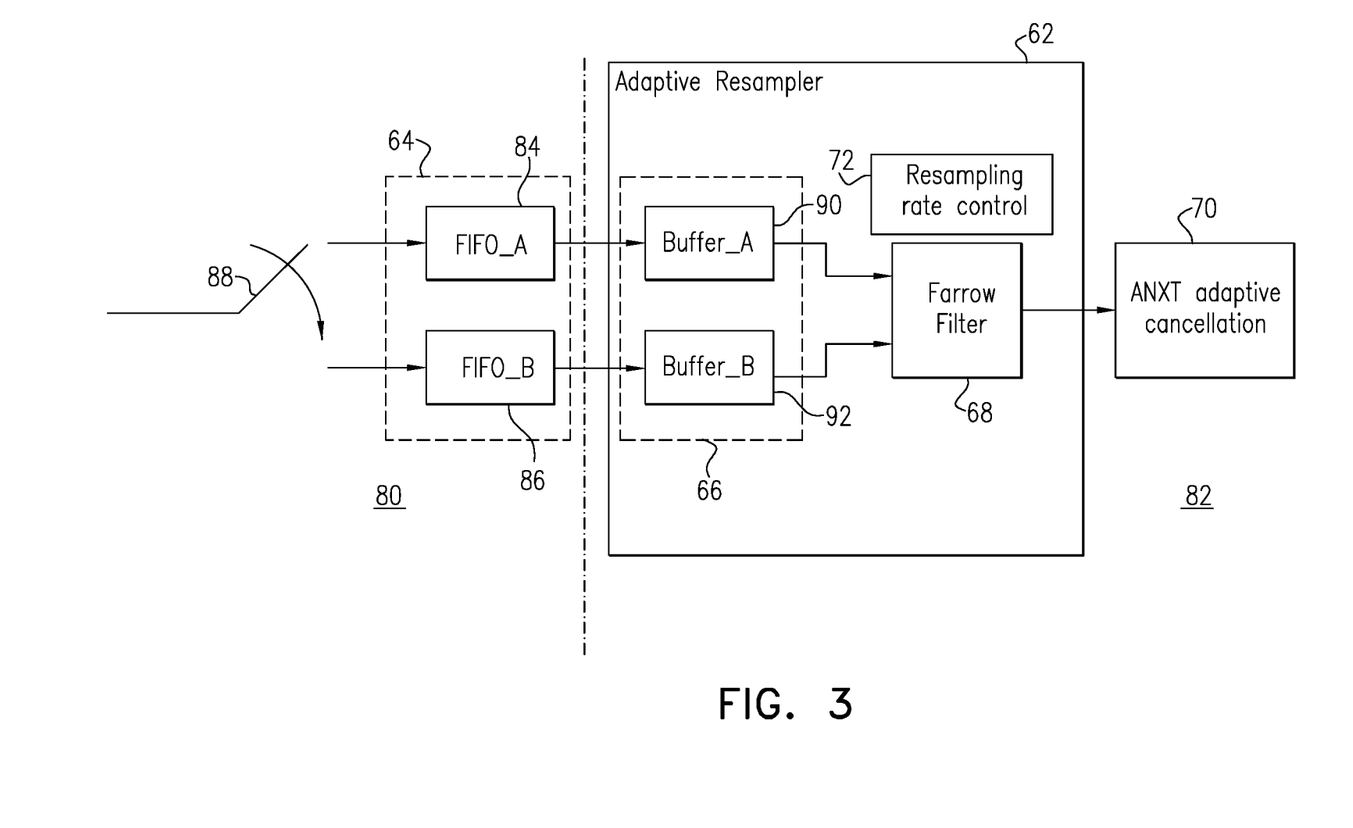
FIG. 3 is a block diagram that schematically illustrates an adaptive resampling circuit, in accordance with an embodiment of the invention.

FIG. 3 is a block diagram that schematically shows details of input buffer 64 and adaptive resampling circuit 62, in accordance with an embodiment of the invention. As illustrated in this figure, input buffer 64 operates in an alien clock domain 80, timed by the clock of transceiver 32, while adaptive resampling circuit 62 operates in a local clock domain 82, timed by the clock of transceiver 34, Because of the difference in clock rates, input buffer 64 is liable to overfill (and thus overflow) if the alien clock rate is greater than the local clock rate, or to underflow (and thus empty out) if the alien clock rate is less than the local clock rate. The mechanisms illustrated in FIGS. 3 and 4 adjust the rate of resampling by adaptive resampling circuit 62 so as to maintain the fill level of input buffer 64 within predefined bounds and thus prevent overflow and underflow.

Input buffer 64 comprises two FIFO memories 84 and 86. A buffer input circuit comprising a switch 88 inputs symbols of data 44 to memories 84 and 86 in alternation. By between switching two parallel memories, input buffer 64 is able to accommodate cases in which the alien clock is substantially faster than the local clock. The locations of the next samples to be written to FIFO memories 84 and 86 are indicated by respective write pointers WP, while the locations of the next samples to be read out to filter input circuit 66 are indicated by respective read pointers RP.

Figure 4:
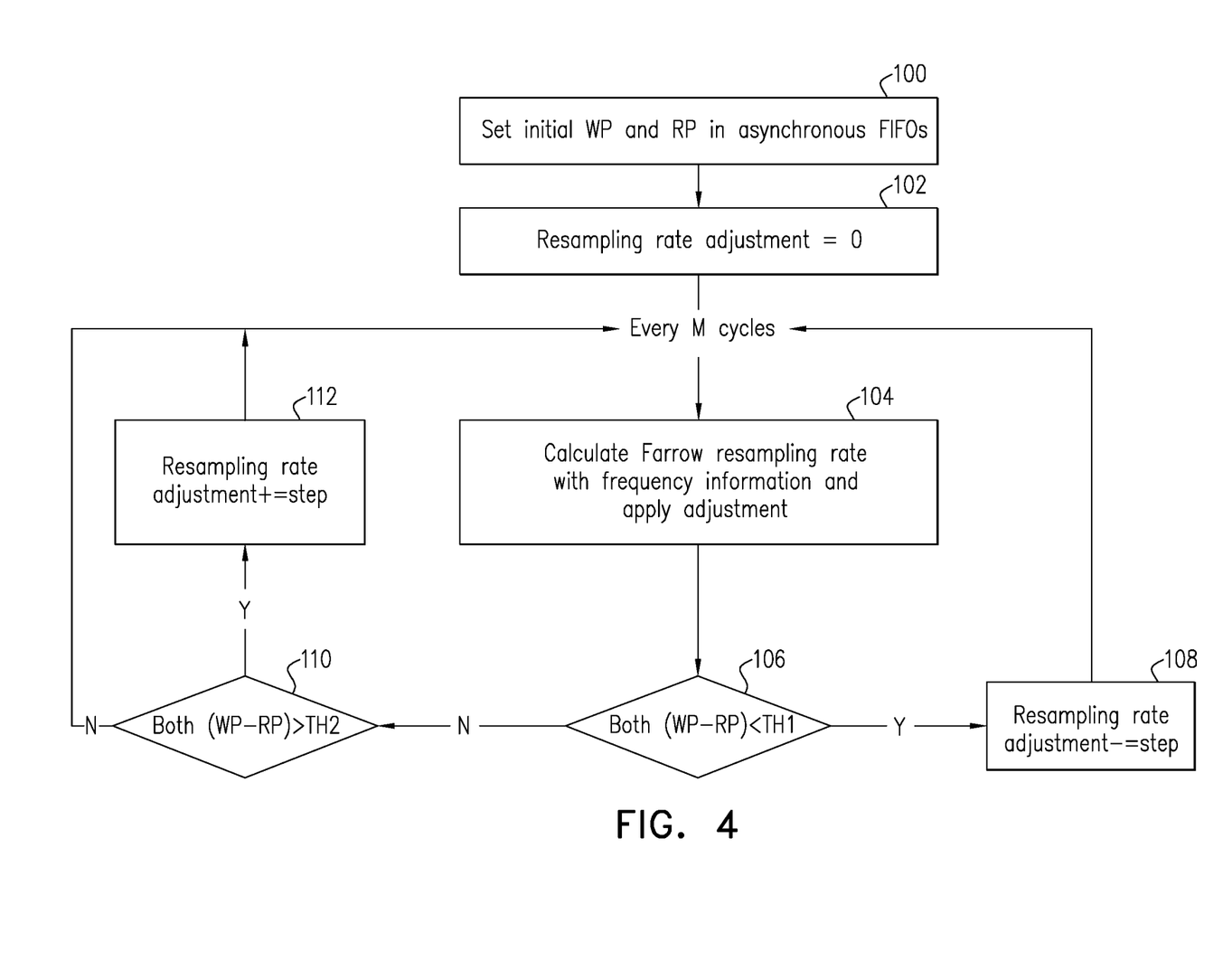
FIG. 4 is a flow chart that schematically illustrates a method for resampling rate control, in accordance with an embodiment of the invention.

Filter input circuit 66 similarly comprises two memories 90 and 92, which fetch and store data from FIFO memories 84 and 86, respectively. Farrow filter 68 reads data samples in alternation from memories 90 and 92. As long as memories 90 and 92 contain less than a threshold number N of samples, filter input circuit 66 will read a respective sample from each of memories 84 and 86 (from the locations indicated by the current read pointers RP) into memories 90 and 92, respectively, in each cycle of the local clock. When memories 90 and 92 contain N samples, filter input circuit 66 will refrain from reading in new samples, FIG. 4 is a flow chart that schematically illustrates a method for resampling rate control carried out by resampling rate control circuit 72, in accordance with an embodiment of the invention. As noted earlier, resampling rate control circuit 72 generates a phase increment, which controls the resampling rate and coefficients of Farrow filter 68. For this purpose, resampling rate control circuit 72 receives the offset between the alien and local clocks and also checks the status of the read and write pointers RP and WP. As long as the separation between the read and write pointers remains within predefined bounds, the resampling rate of Farrow filter 68 remains unchanged. If the separation between the read and write pointers is outside these bounds, the resampling rate is adjusted gradually to bring the pointers closer together.

Upon startup of system 20, the read and write pointers are RP and WP are set to predefined initial values, at a pointer initialization step 100. The resampling rate adjustment is likewise set to an initial default value, at a rate initialization step 102. During operation of adaptive resampling circuit 62, resampling rate control circuit 72 periodically recalculates the phase increment between the alien and local clocks, at a rate adjustment step 104. In the example shown in FIG. 4, this recalculation takes place every M cycles, wherein M is typically a large number. Phase accumulator 74 calculates the integer and fractional parts of the cumulative phase difference between the alien and local clocks, and filter input circuit 66 sets the read pointers RP in FIFO memories 84 and 86 to compensate for the integer phase difference.

For example, to calculate the phase increment at each pass i through step 104, resampling rate control circuit 72 may use the frequency offset values F1 and F2 of the alien and local clock frequencies Freq1 and Freq2, respectively, relative to a local oscillator frequency Freq0:

$$F1[i]=(Freq1[i]-Freq0)/Freq0$$

$$F2[i]=(Freq2[i]-Freq0)/Freq0$$

The resulting phase increment U[i] is then given by:

$$U[i] = \frac{1+F1[i]}{1+F2[i]} \approx (1+F1[i])(1-F2[i]+F2^2[i])$$

Phase accumulator 74 sums the value of U[i] over time to compute the cumulative phase shift, and outputs the integer and fractional parts as noted above.

After each new calculation and adjustment of the resampling rate at step 104, resampling rate control circuit 72 checks the difference between the current locations of the read and write pointers WP and RP in both FIFO memories 84 and 86, at a pointer checking step 106, If the difference is less than a minimum threshold (TH1), resampling rate control circuit 72 reduces the resampling rate by a small increment, at a rate reduction step 108. Otherwise, resampling rate control circuit 72 checks whether the difference between the pointer locations is greater than a maximum threshold (TH2), at a threshold checking step 110. If so, resampling rate control circuit 72 increases the resampling rate by a small increment, at a rate increase step 112. This cycle continues throughout operation of system 20.

Figure 5:
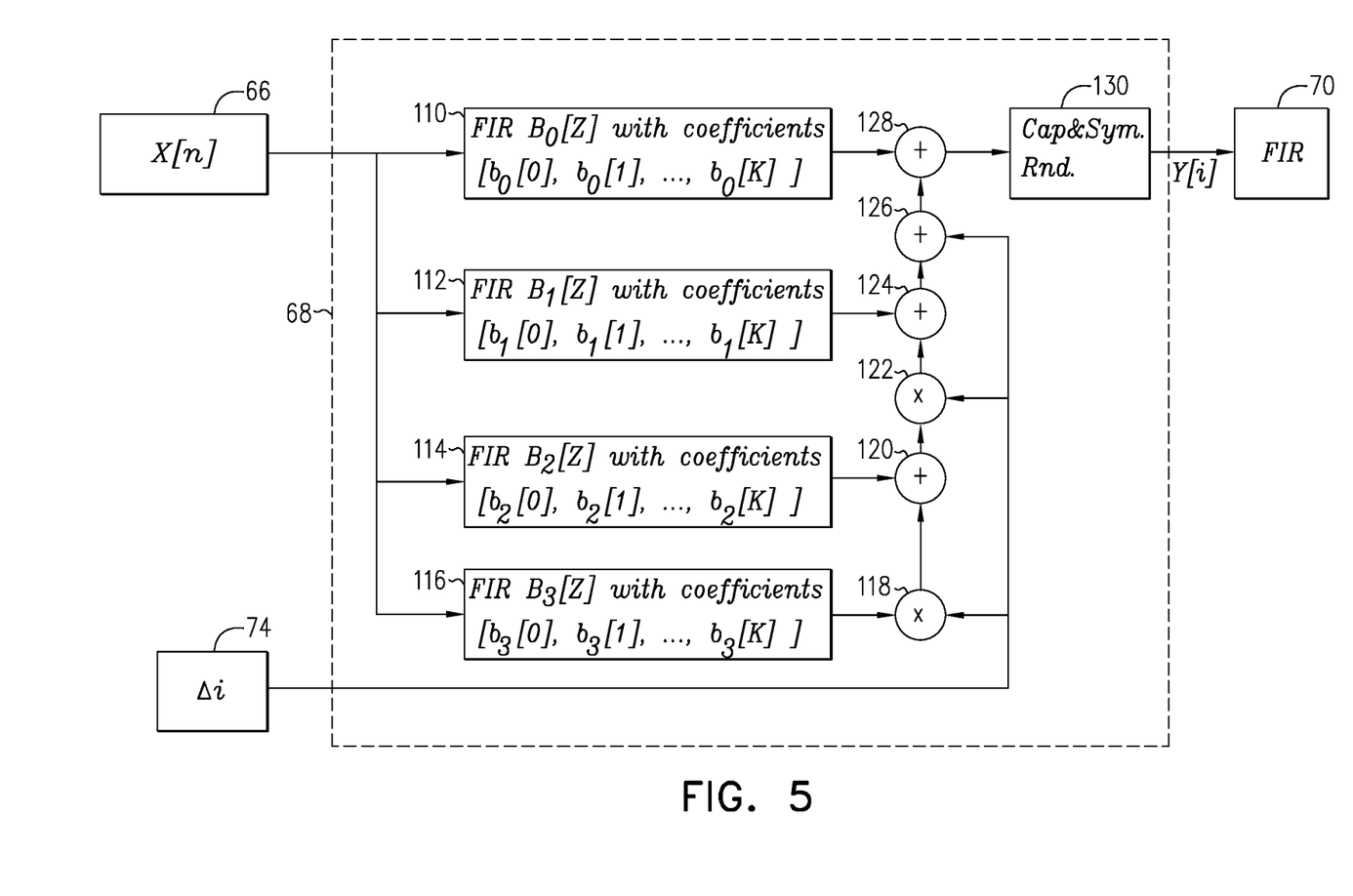
FIG. 5 is a block diagram that schematically illustrates a resampling filter, in accordance with an embodiment of the invention.

FIG. 5 is a block diagram that schematically shows details of Farrow filter 68, in accordance with an embodiment of the invention. As noted above, the Farrow filter resamples alien data 44 at an adaptive, fractional resampling rate, using a polynomial approximation of the resampling coefficients. Adjustments to the resampling phase in Farrow filter 68 are implemented simply by changing the phase value in the filter, rather than reloading all the coefficient values. This approach enables Farrow filter 68 to carry out the resampling functions of adaptive resampling circuit 62 efficiently, using an FIR with a much smaller number of coefficients and input samples in each cycle than are required for conventional resampling schemes based on upsampling, filtering, and downsampling of the input data. Alternatively, adaptive resampling circuit 62 may implement other sorts of adaptive resampling algorithms, particularly algorithms that support fractional resampling.

Farrow filter 68 receives as its inputs a stream of input samples x[n] from filter input circuit 66 and the current fractional phase offset $\Delta_i$ between the alien and local clocks provided by phase accumulator 74. Farrow filter 68 in this example comprises four banks 110, 112, 114, 116 of filter coefficients, with K coefficients in each bank. Bank 110 contains zero-order coefficients $B_0[z]$; bank 112 contains first-order coefficients $B_1[z]$, which are multiplied by $\Delta_i$; bank 114 contains second-order coefficients $B_1[z]$, which are multiplied by $\Delta_i^2$; and bank 116 contains third-order coefficients $B_3[z]$, which are multiplied by $\Delta_i^3$. The coefficients in banks 110, 112, 114, 116 are multiplied and summed to give adjusted tap values $b_0(j)+b_1(j)\Delta_i+b_2(j)\Delta_i^2+b_3(j)\Delta_i^3$, which are convolved with the input samples x[n]. The multiplication and summation of the coefficients are carried out by multipliers 118, 122, 126 and adders 120, 124 and 128. Alternatively, larger or smaller numbers of banks may be used, depending on the desired degree of precision.

The results of this filtering operation are regularized by a limit and rounding circuit 130, thus producing a stream of resampled data values y[i]. These values are input to digital filter 70 to generate the crosstalk error signal, as explained above.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a transmitter, which is coupled to transmit over a first communication link a first signal comprising first data timed by a first clock; and
a receiver, which is disposed in proximity to the transmitter and comprises:
a front end coupled to receive over a second communication link a second signal comprising second data timed by a second clock, which is independent of the first clock, and to generate a stream of data samples corresponding to the second signal;
an input buffer coupled to receive the first data, timed by the first clock, from the transmitter;
a phase detector configured to measure a time-varying phase shift between the first clock and the second clock;
an adaptive resampling circuit configured to resample the first data in accordance with the measured phase shift to generate resampled data timed by the second clock, and to adjust a rate of resampling the first data responsively to a fill level of the input buffer, so as to maintain the fill level within predefined bounds; and
a crosstalk cancellation circuit configured to apply the resampled data in estimating and subtracting an alien crosstalk component from the stream of data samples.

2. The apparatus according to claim 1, wherein the first and second communication links are Ethernet BASE-T links.

3. The apparatus according to claim 1, wherein the crosstalk cancellation circuit comprises a digital filter, which is configured to filter the resampled data to generate a crosstalk error signal, and a subtracter, which is coupled to subtract the crosstalk error signal from the data samples.

4. The apparatus according to claim 1, wherein the adaptive resampling circuit comprises a Farrow filter, which is configured to apply resampling coefficients to the first data to generate the resampled data.

5. The apparatus according to claim 4, wherein the time-varying phase shift measured by the phase detector includes an integer component and a fractional component, and wherein the adaptive resampling circuit is configured to adjust the resampling coefficients of the Farrow filter responsively to the fractional component of the time-varying phase shift.

6. The apparatus according to claim 5, wherein the adaptive resampling circuit is configured to select the first data from the input buffer responsively to the integer component of the time-varying phase shift for processing by the Farrow filter.

7. The apparatus according to claim 1, wherein the input buffer comprises first and second first-in first-out (FIFO) memories and a buffer input circuit, which is coupled to write samples of the first data in alternation to the first and second FIFO memories timed by the first clock, and wherein the adaptive resampling circuit comprises a filter input circuit, which is coupled to read out the samples of the first data from the first and second FIFO memories in alternation, at times that are timed by the second clock and depend on the fill level.

8. The apparatus according to claim 1, wherein the receiver comprises an equalizer, which is coupled to receive and filter the stream of data samples following subtraction of the alien crosstalk component.

9. A method for communication, comprising:
receiving first data timed by a first clock;
storing the first data in an input buffer;
receiving a signal comprising second data timed by a second clock, which is independent of the first clock, and generating a stream of data samples corresponding to the second signal;
resampling the received first data responsively to a time-varying phase shift between the first and second clocks to generate resampled data timed by the second clock;
adjusting a rate of resampling e first data responsively to a fill level of the input buffer, so as to maintain the fill level within predefined bounds; and
applying the resampled data in estimating and subtracting an alien crosstalk component from the stream of data samples.

10. The method according to claim 9, wherein the first and second communication links are Ethernet BASE-T links.

11. The method according to claim 9, wherein applying the resampled data comprises digitally filtering the resampled data to generate a crosstalk error signal, and subtracting the crosstalk error signal from the data samples.

12. The method according to claim 9, wherein resampling the received first data comprises measuring the time-varying phase shift and adaptively resampling the first data in accordance with the measured phase shift.

13. The method according to claim 12, wherein adaptively resampling the first data comprises applying resampling coefficients of a Farrow filter to the first data to generate the resampled data.

14. The method according to claim 13, wherein measuring the time-varying phase shift comprises measuring an integer component and a fractional component of the time-varying phase shift, and wherein adaptively resampling the first data comprises adjusting the resampling coefficients of the Farrow filter responsively to the fractional component of the time-varying phase shift.

15. The method according to claim 14, wherein receiving the first data comprises storing the first data in an input buffer, and wherein adaptively resampling the first data comprises selecting the first data from the input buffer responsively to the integer component of the time-varying phase shift for processing by the Farrow filter.

16. The method according to claim 9, wherein storing the first data in the input buffer comprises writing samples of the first data in alternation to first and second first-in first-out (FIFO) memories, timed by the first clock, and
wherein resampling the first data comprises reading out the samples of the first data from the first and second FIFO memories in alternation, at times that are timed by the second clock and depend on the fill level.

17. The method according to claim 9, wherein the first data are transmitted over a first communication link, and the signal is received over a second communication link, in proximity to the first communication link, and wherein applying the resampled data comprises reducing the alien crosstalk in the signal due to the first communication link.

18. The method according to claim 9, and comprising applying an equalizer to filter the stream of data samples following subtraction of the alien crosstalk component.

* * * * *